United States Patent [19]

Itsumi

[11] Patent Number: 5,757,278
[45] Date of Patent: May 26, 1998

[54] PERSONAL VERIFICATION SYSTEM

[75] Inventor: Kazuhiro Itsumi, Kawasaki, Japan

[73] Assignee: Kabushiki Kaisha Toshiba, Kawasaki, Japan

[21] Appl. No.: 573,639

[22] Filed: Dec. 18, 1995

[30] Foreign Application Priority Data

Dec. 26, 1994 [JP] Japan .................. 6-322066

[51] Int. Cl.$^6$ .............. G06F 7/04; G06K 9/00; G06K 9/18; G07D 7/00
[52] U.S. Cl. .............. 340/825.31; 382/126; 382/124; 382/116; 382/182; 340/825.34
[58] Field of Search .................. 382/126, 124, 382/116, 121, 120, 182; 340/825.34, 825.31; 73/865.7, 172

[56] References Cited

U.S. PATENT DOCUMENTS

| | | | |
|---|---|---|---|
| 4,032,889 | 6/1977 | Nassimbene | 340/146.3 E |
| 4,353,056 | 10/1982 | Tsikos . | |
| 4,577,345 | 3/1986 | Abramov | 382/4 |
| 5,218,472 | 6/1993 | Jozefowicz et al. | 359/584 |
| 5,429,006 | 7/1995 | Tamori | 73/862.046 |

OTHER PUBLICATIONS

Masahiro Takeda, et al. "Finger Image Identification Method For Personal Verification" Proceedings 10th International Conference on Pattern Recognition, vol. 1 (pp. 761–766), 1990.

*Primary Examiner*—Michael Horabik
*Assistant Examiner*—Anthony A. Asongwed
*Attorney, Agent, or Firm*—Oblon, Spivak, McClelland, Maier & Neustadt, P.C.

[57] ABSTRACT

A plurality of linear electrodes, which are perpendicular to the longitudinal direction of a finger to be measured, are arranged on a substrate. A porous film is placed on the electrodes. The porous film repels water, such as waterdrop, but transmits water vapor. When the finger is pressed against the porous film, water (sweat) diffused through sweat pores of projected portions of the finger surface is further diffused through holes of the porous film and reaches to the electrode located just under the projected portions of the finger surface. At this time, the resistance of the portion between the electrodes, to which the water reaches, is lowered due to ions existing in the water. Resistances across adjacent electrodes are serially read and synthesized, thereby obtaining fingerprint information.

28 Claims, 7 Drawing Sheets

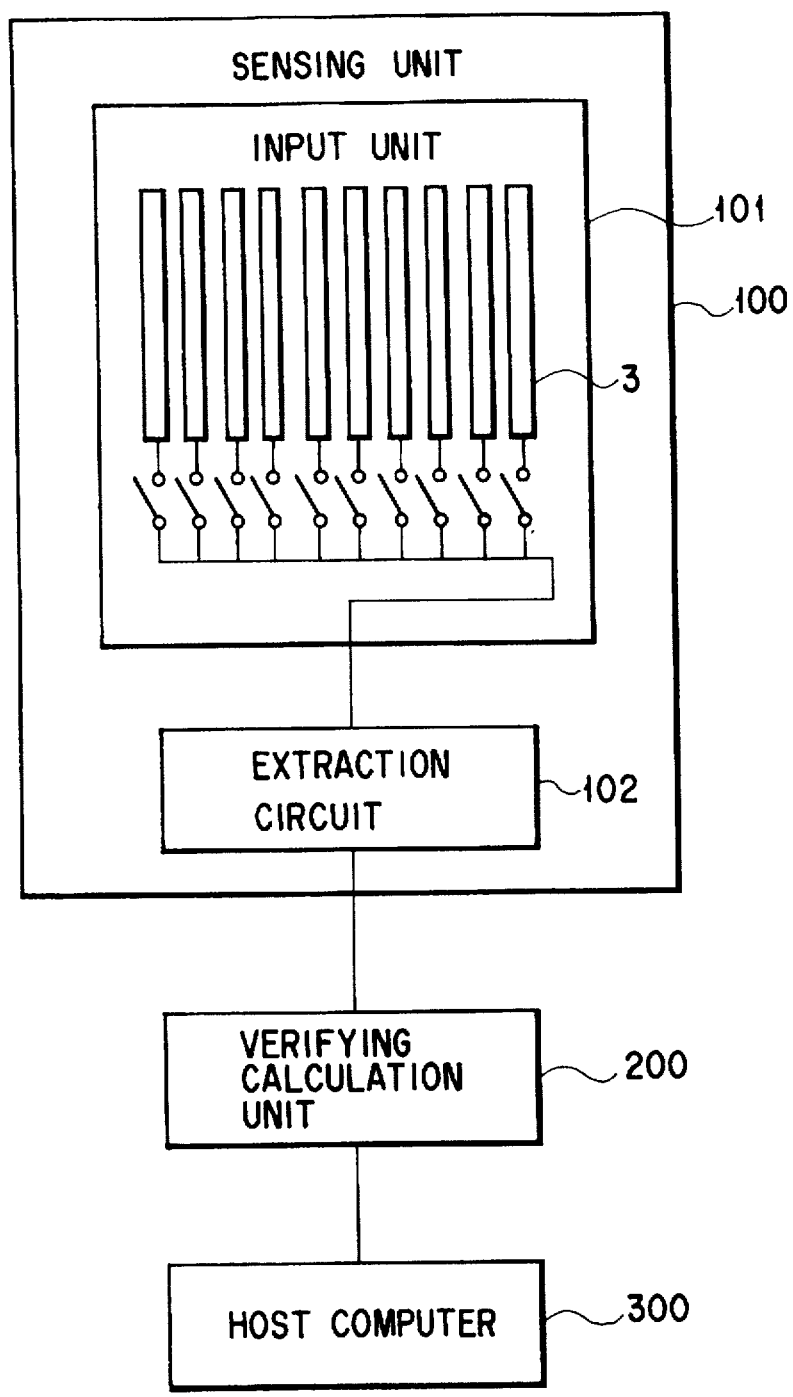
F I G. 1

$$= \frac{1}{ri1} + \frac{1}{ri2} + \frac{1}{ri3} + \frac{1}{ri4}$$

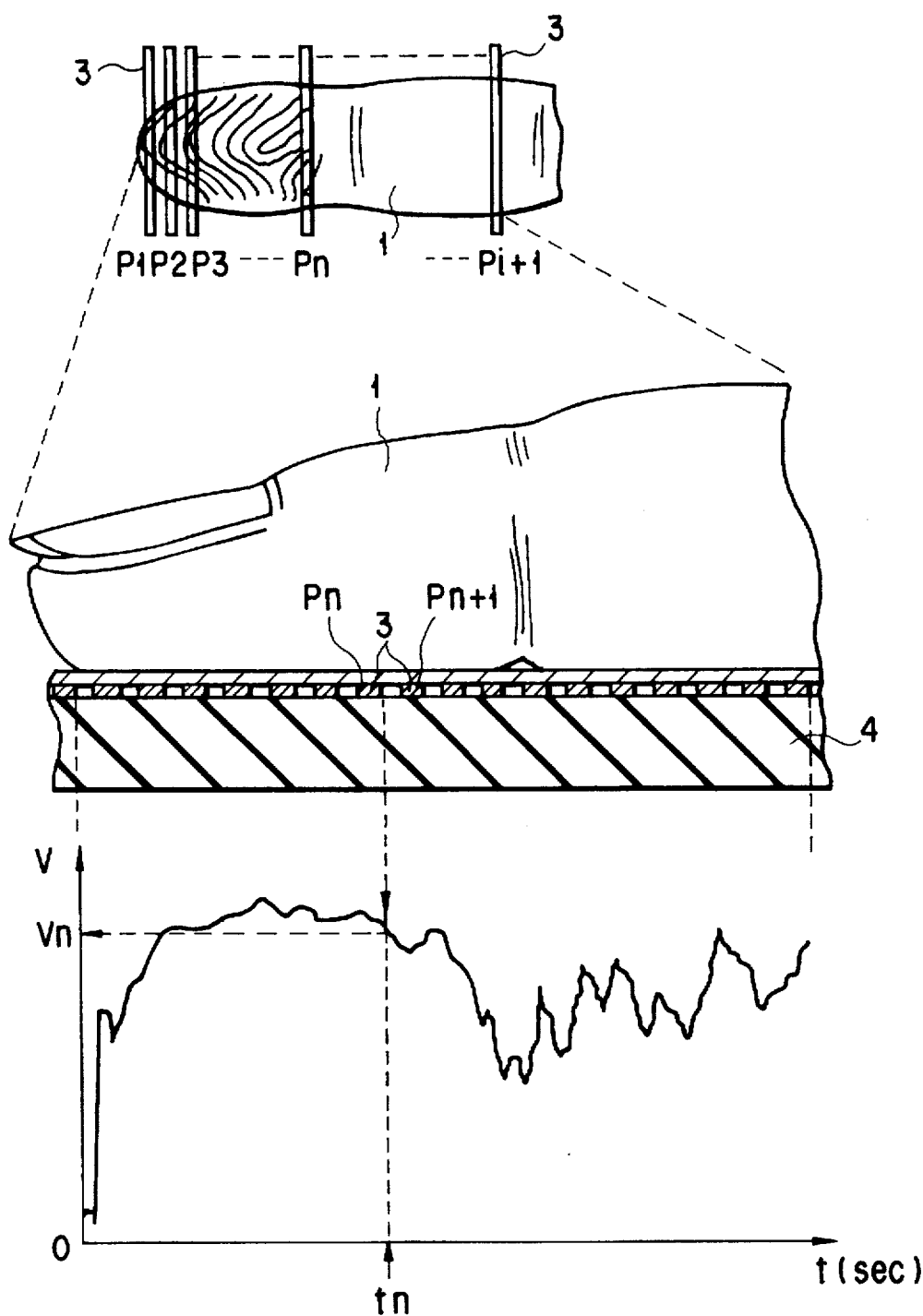
F I G. 5

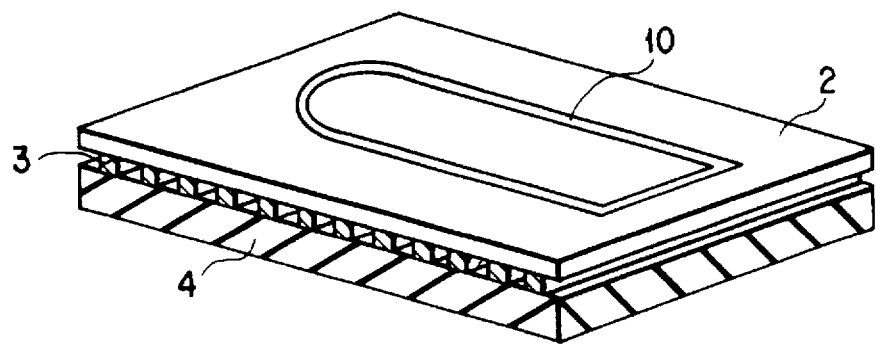
F I G. 8
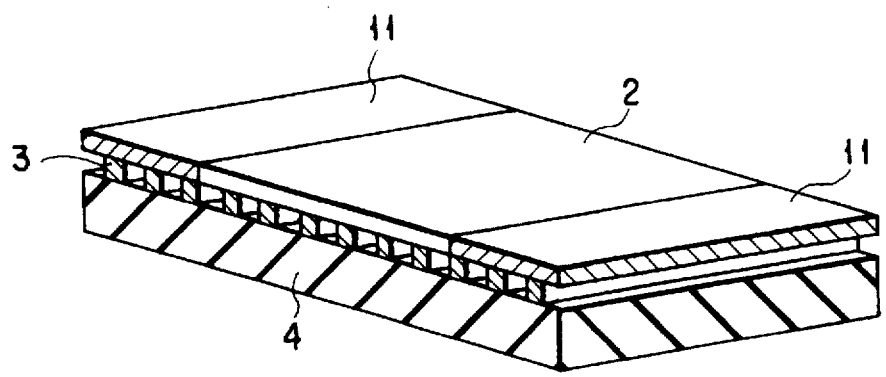
F I G. 9
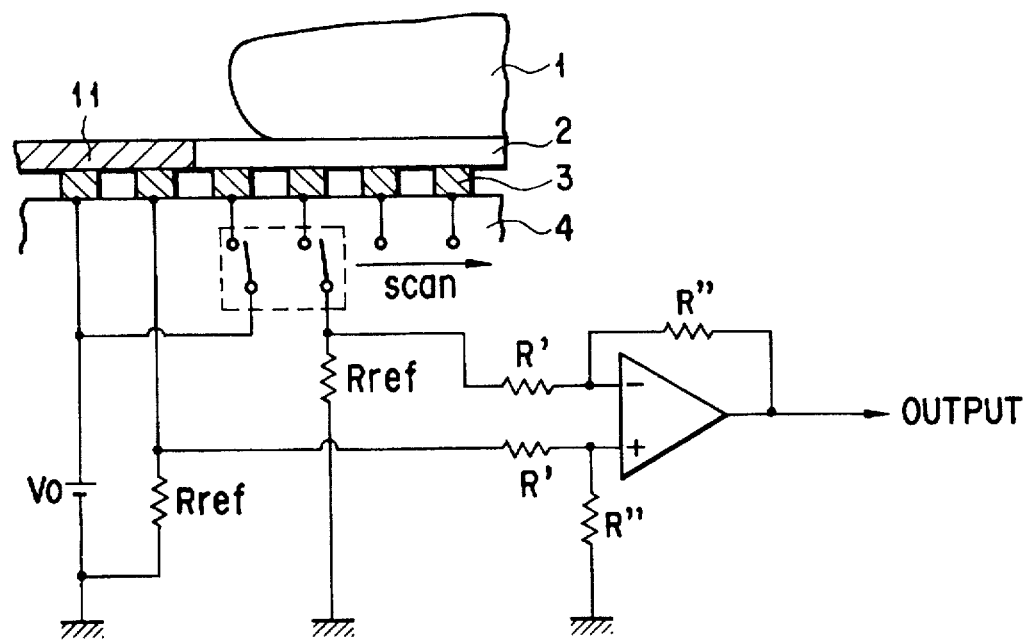
F I G. 10

PERSONAL VERIFICATION SYSTEM

BACKGROUND OF THE INVENTION

1. Field of the Invention

The present invention relates to a personal verification system using a surface shape sensor, and more particularly to a personal verification system of an electrode array system, in which a finger is pressed against an electrode array, and a change in resistance across adjacent electrodes can be serially read, thereby extracting a characteristic of the finger.

2. Description of the Related Art

In recent years, personal verification apparatuses, for managing an entrance into or exit from an important institution, have attracted public attention. In particular, a fingerprint is used most as means for verifying a person.

Conventionally, various systems have been proposed as fingerprint input devices. Of the conventional systems, a method for optically detecting a fingerprint as a two-dimensional image signal is most frequently employed. In addition, some methods, for detecting a pressure in accordance with the ruggedness of a fingerprint as a two-dimensional image signal, have been proposed.

Further, a method has been proposed, in which a one-dimensional projection in the longitudinal direction of a finger is generated from an image signal of the finger as a whole, and the one-dimensional signal is used as a personal verifying signal representing a characteristic amount of the finger (Proceeding 10th International Conference on Pattern Recognition pp. 761–766, vol. 1; M. Takeda et al.; 1990). With this method, since the one-dimensional signal is used, the amount of data is less and the process algorithm is more simple, as compared to that of a conventional two-dimensional signal of a fingerprint image. For this reason, the signal processing speed is fast, thereby reducing the time required for verification collating.

Persons including the present inventor have proposed a verification method in which a plurality of linear electrodes, extending in a direction perpendicular to the longitudinal direction of a finger, are arranged alongside, and resistances across adjacent electrodes are serially read and synthesized as a signal, which is used instead of an image signal (U.S. patent application Ser. No. 08/178,902). With this method, since an optical system is not required, the apparatus can be compact and cost little.

In the method as described above, if detecting electrodes is exposed, the reliability of verification is lowered for the following reasons: (1) if an object charged with static electricity is brought into contact with the detecting electrodes, a peripheral circuit may be damaged; (2) the detecting electrodes may be worn through longtime use or cut due to a crack; (3) if the detecting electrode is considerably stained, a fingerprint cannot be detected; and (4) if the detecting electrodes become wet, a fingerprint cannot be detected. It has been therefore desirable that the electrodes surface be covered. For example, a method is proposed, in which detecting electrodes are covered with a sheet having a constant electric resistance, so that, when a finger is pressed against the sheet, the ruggedness of the finger is detected as ruggedness of the sheet. In this method, however, even if the sheet is as thin as possible, the resolution will be inevitably low. This method therefore also requires some improvement.

SUMMARY OF THE INVENTION

An object of the present invention is to provide a personal verification system, wherein a plurality of linear electrodes, extending in a direction perpendicular to the longitudinal direction of a finger, are arranged alongside, resistances across adjacent electrodes are serially read and synthesized as a signal used for verification, the personal verification system comprising an input unit which allows high reliability, e.g., waterproofness, a simple structure and low manufacturing cost.

The present inventor has discovered, from the results of experiments on signal detecting mechanisms, that a detection signal depends on water diffused through sweat pores on the surface of a finger. Based on the experiment results, a porous film, which repels water and transmits only water vapor, is arranged on the electrode surface. As a result, there is provided a personal verification system which produces a signal equivalent to a signal obtained by the conventional systems having uncovered electrodes, and considerably improves the reliability of the verification.

According to an aspect of the present invention, there is provided a personal verification system comprising: a plurality of linear electrodes arranged on a substrate; a porous film arranged on the plurality of linear electrodes; and detector for detecting a change in resistance across the linear electrodes, when a finger is placed on the porous film in a direction perpendicular to a longitudinal direction of the linear electrodes.

The porous film is formed of a material which repels water and transmits only water vapor. For example, an organic material, selected from a group including fluoroplastics, polycarbonate and cellulose acetate, can be used as the material.

In a personal verification system, wherein a plurality of linear electrodes, extending in a direction perpendicular to the longitudinal direction of a finger, are arranged alongside, and resistances across adjacent electrodes are serially read and synthesized as a signal, which is used instead of an image signal, if the electrodes are exposed, fingerprint information is influenced by the change of the environment, for example waterdrop adheres to the electrodes or a finger is stained, and satisfactory repeatability cannot be maintained. In contrast, according to the present invention in which the electrodes are covered by the aforementioned porous film, a stable signal can be obtained, irrespective of the change of the environment, so that the reliability of the verification is improved. In addition, the system of the present invention has the advantage of the conventional systems, that is, it can be mounted on a small device. The present invention is therefore applicable to an IC card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the overall structure of a personal verification system according to an embodiment of the present invention;

FIG. 5 is a diagram for explaining measurement of fingerprint information in accordance with the measurement principle shown in FIG. 4;

FIG. 8 is a diagram showing a first modification of the input unit of the personal verification system shown in FIG. 1;

FIG. 9 is a diagram showing a second modification of the input unit of the personal verification system shown in FIG. 1; and FIG. 10 is a diagram for explaining measurement of fingerprint information in the personal verification system to which the second modification of the input unit shown in FIG. 9 is applied.

DETAILED DESCRIPTION OF THE PREFERRED EMBODIMENTS

Figure 2:
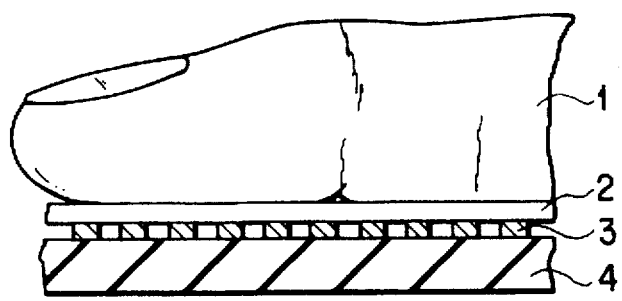
FIG. 2 is a longitudinal cross-sectional view showing an input unit of the personal verification system shown in FIG. 1.

An embodiment of the present invention will be described with reference to the accompanying drawings.

FIG. 1 is a block diagram showing a personal verification system (apparatus) according to an embodiment of the present invention. The personal verification system comprises a sensing unit 100, a verifying calculation unit 200 and a host computer 300. The sensing unit 100 includes an input unit 101 through a fingerprint is input, and extraction circuit 102 for generating fingerprint information in accordance with the fingerprint obtained by the input unit 101 (extracting characteristics from the fingerprint). The verifying calculation unit 200 executes various processes such as filtering process and collating calculation. The host computer 300 executes system control and characteristic data registration on the basis of an output from the verifying calculation unit 200.

Figure 3:
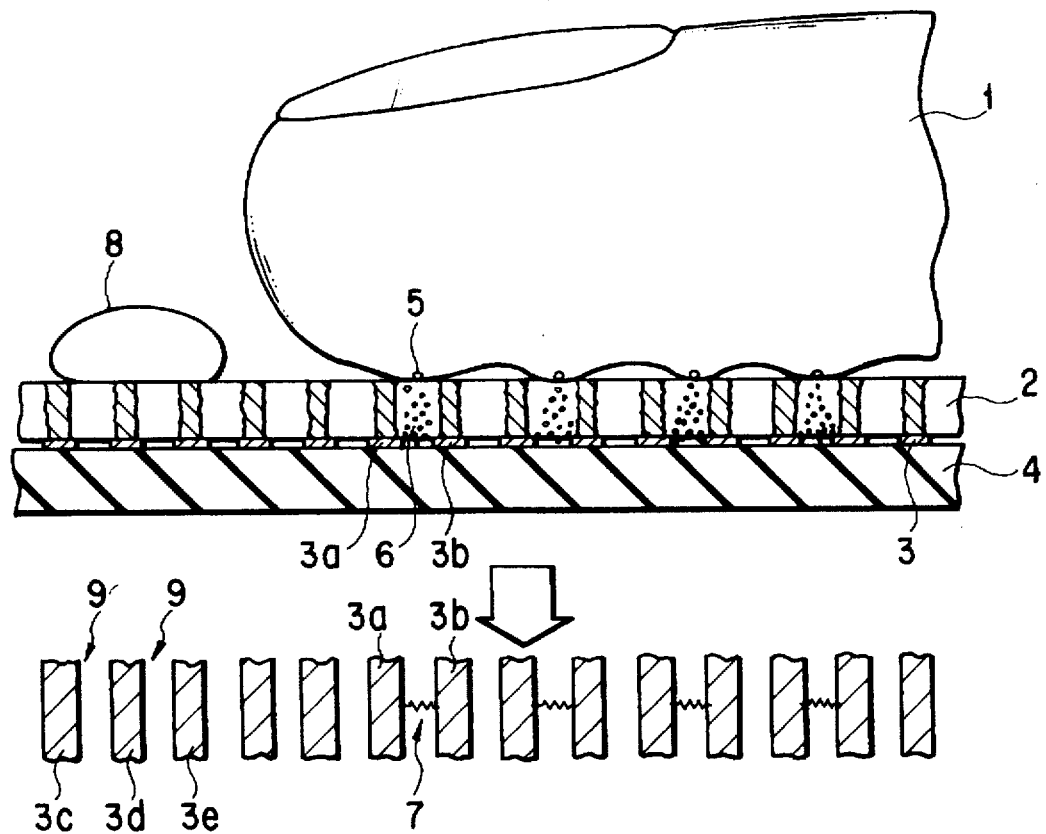
FIG. 3 is a diagram for explaining that conductive paths are formed by sweat exuding from sweat pores in projected portions of a finger surface in the input unit shown in FIG. 2.

FIG. 2 is a diagram showing the input unit 101 of the personal verification system shown in FIG. 1. FIG. 3 is a diagram for explaining that conductive paths are formed between linear electrodes due to sweat exuding from sweat pores in projected portions of the finger surface.

An electrode array having a plurality of linear electrodes 3 are formed on a substrate 4. The electrodes may be formed of Cu thin film, Au thin film, Ni-plated thin film, Pt thin film or Pd thin film. Since the electrodes are to measure an object having a relatively high resistance, they can be formed of any material (e.g., oxide film such as ITO (Indium Tin Oxide)) except an insulting material. The method for forming the electrodes is not limited to a particular one: i.e., any conventional methods, such as plating and deposition, can be applied. The quality of the film and the state of an edge are not limited also; however it is preferable that the film be flat, having a uniform thickness. The substrate 4 is formed of a material of printed circuit boards (e.g., glass epoxy), a ceramic plate, or a metal thin plate coated with an insulating material. The electrodes are arranged at pitch about several tens μm that is smaller than the fingerprint pitch (about 0.5 mm). The size of the electrode array in the longitudinal direction, corresponding to the number of electrodes, generally has a length completely including the distance between the tip and the second joint of a finger.

A porous film 2 is arranged on the surface of the electrode array. It is preferable that the porous film be 100 μm thick or thinner, maintaining a strength so as not to be damaged or deformed due to a pressure by a finger. The porous film may be formed of organic material, for example, fluoroplastics, such as PTFE (polytetrafluoroethylene), polycarbonate, cellulose acetate; however it can be formed of inorganic material. A hydrophilic material is not suitable for the porous film. Pores can be formed by any method: for example, eluting a substance to be eluted, mixed in a film; sintering polymer rough elements; or etching a film by irradiating polymer with radiation. In other words, whatever material or whatever pores can be applied to the porous film of the embodiment, so far as the film has the characteristic of transmitting only water vapor immediately. It is also possible that the porous film 2 is formed by coating the electrodes 3 with resin thin film and patterning small holes by photolithography used in the semiconductor process.

Figure 6A:
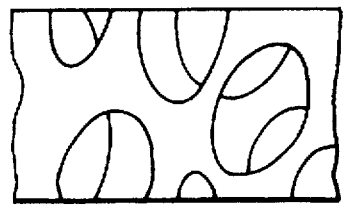
FIGS. 6A to 6D are diagrams showing porous film applied to the embodiment of the present invention.
Figure 6B:
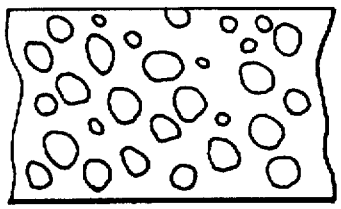
Figure 6C:
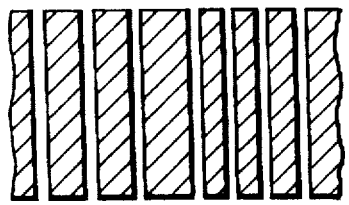
Figure 6D:
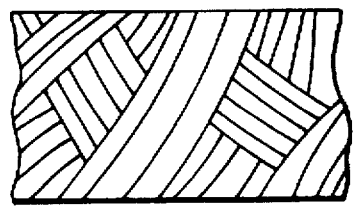

FIGS. 6A to 6D show examples of the structures of the porous film. The structures shown in FIGS. 6A and 6B are obtained by eluation or sintering. The structure shown in FIG. 6C is obtained by irradiating a film with radiation and etching it. A fiber film as shown in FIG. 6D, instead of a porous film, can also be used. Since the adhesion between the film and, the electrodes and the substrate surface is not particularly required, even if the film is only put on the surface of the electrode array, fingerprint information can be measured. In contrast, even if the film is firmly adhered to the surface of the electrode array by adhesive, fingerprint information can also be measured when pores of the film are not stopped up.

Figure 4:
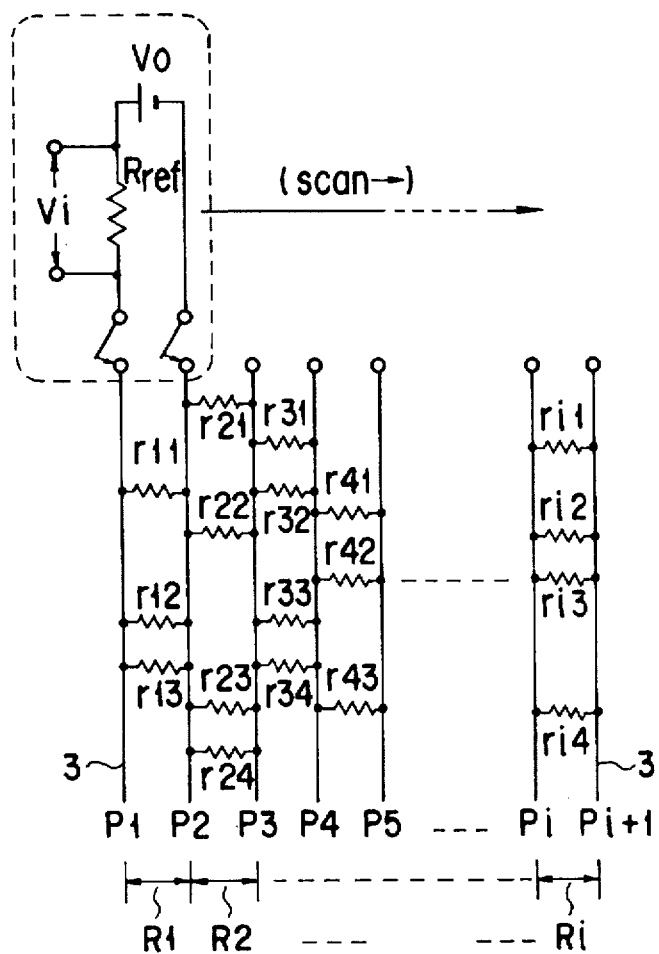
FIG. 4 is a diagram for explaining measurement principle of the personal verification system shown in FIG. 1.

A process of detecting fingerprint information according to the above embodiment will now be described with reference to FIGS. 3 to 5. Note that, details of a verification method using the linear electrodes are described in a U.S. Patent Application (U.S. patent application Ser. No. 08/178, 902 now issued as U.S. Pat. No. 5,559,504 on Sep. 24, 1996).

As shown in FIG. 3, a finger 1, whose fingerprint is to be detected, is pressed against the porous film in a direction perpendicular to the surface of the electrode array. The surface of the finger has skin projections in accordance with the arrangement of sweat pores, through which sweat is always diffused naturally. In other words, water containing small amount of Na and Cl is diffused from the projected portions of the finger surface. Therefore, when the finger is pressed against the porous film 2, water (sweat) diffused through the sweat pores of the projected portions of the finger surface is further diffused through the holes of the porous film and reaches to the electrode located just under the projected portion of the finger surface. At this time, the resistance of the portion between the electrodes, to which the water reaches, is lowered due to ions existing in the water. Accordingly, the resistance of the portion corresponding to the projection of the finger surface is lower than that of the other portion. For example, as shown in FIG. 3, sweat 6 diffused through sweat pores 5 reaches to linear electrodes 3a and 3b through pores of the porous film. As a result, a conductive path 7 is formed by the sweat between the linear electrodes 3a and 3b. In this time, even if waterdrop 8, which is not diffused through the sweat pores of the projected portions of the finger surface, is adhered to the porous film 2, it cannot pass through the pores of the porous film 2.

Therefore, no conductive path is formed in portions 9 between the adjacent two of the linear electrodes $3c$, $3d$ and $3e$, located just under the waterdrop 8.

In the state as described above (in which the conductive path is formed), the resistances of the portions between adjacent electrodes are serially read in the order along the longitudinal direction of the finger. The method of measurement the resistance will be described with reference to FIG. 4. When a finger is pressed against an (i+1) number of electrodes 3, diffused water reaches to the electrodes in accordance with the amount of projected portions of the finger surface. As a result, the portion between adjacent electrodes located just under a projected portion of the finger surface has a resistance value ($R_n$) obtained by multiplying the resistivity of water by the area of the projected portion. A reference resistor $R_{ref}$ and a constant voltage source $V_0$ are connected across two adjacent electrodes through analog switches, as shown in FIG. 4. The potential difference $V_i$ between the ends of the reference resistor is obtained by the following equation.

$$V_i = R_{ref} \cdot V_0 / (R_{ref} + R_i)$$

The analog switches are switched, so that the potential differences are serially read along the longitudinal direction of the finger. FIG. 5 shows a pattern corresponding to the differences plotted in the time-sequential manner. The pattern is equivalent to a projection signal along the longitudinal direction of the finger. Since a number of channels are formed between the electrodes, the circuit can be compact, if analog multiplexer ICs are used as the analog switches. The point $t_n$ in FIG. 5 indicates a time when an electric resistance $R_n$ between the electrodes $P_n$ and $P_{n+1}$ is detected.

Figure 7A:
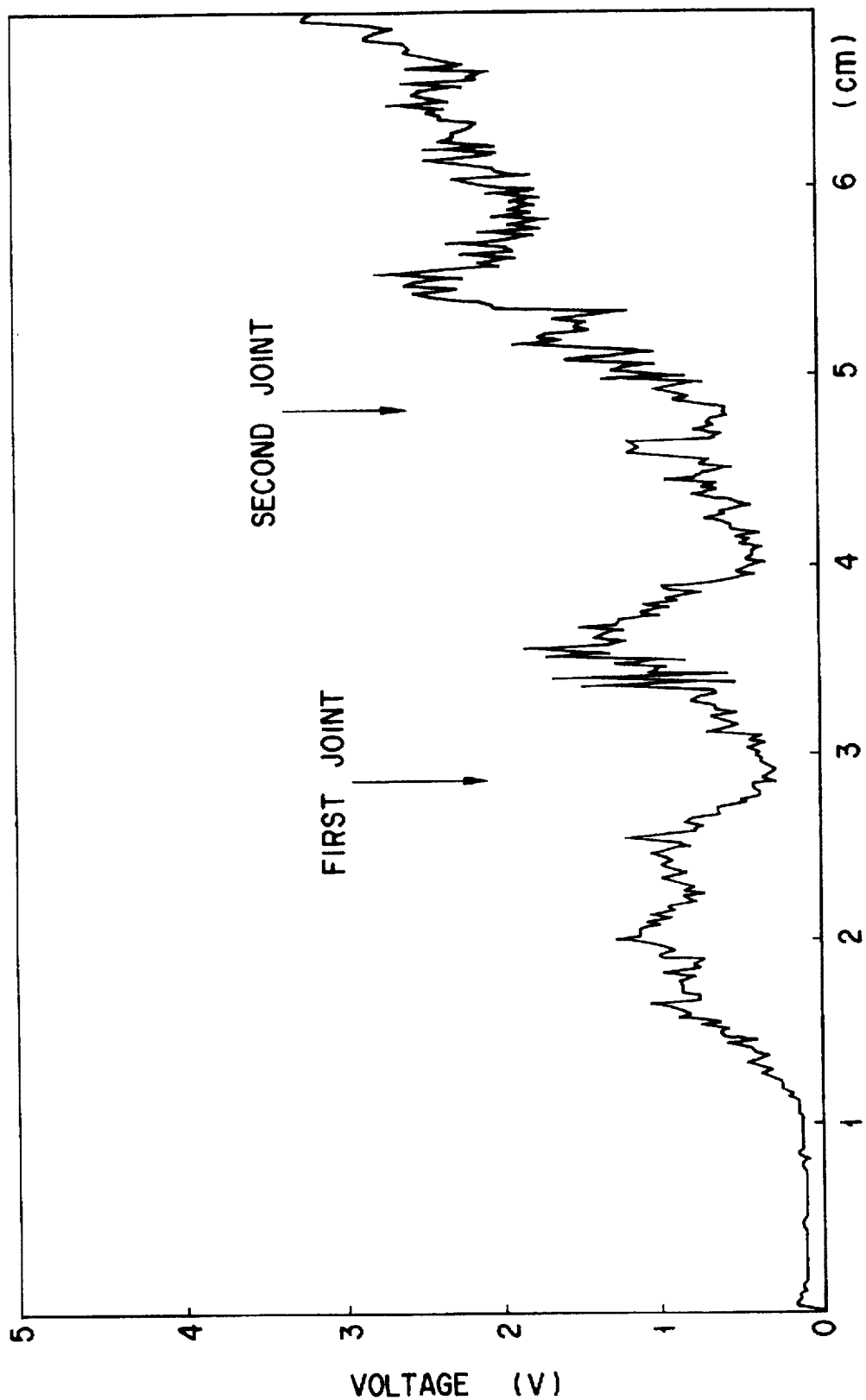
FIGS. 7A and 7B are diagrams respectively showing fingerprint information obtained by the embodiment of the present invention and that obtained by the conventional personal verification system.
Figure 7B:
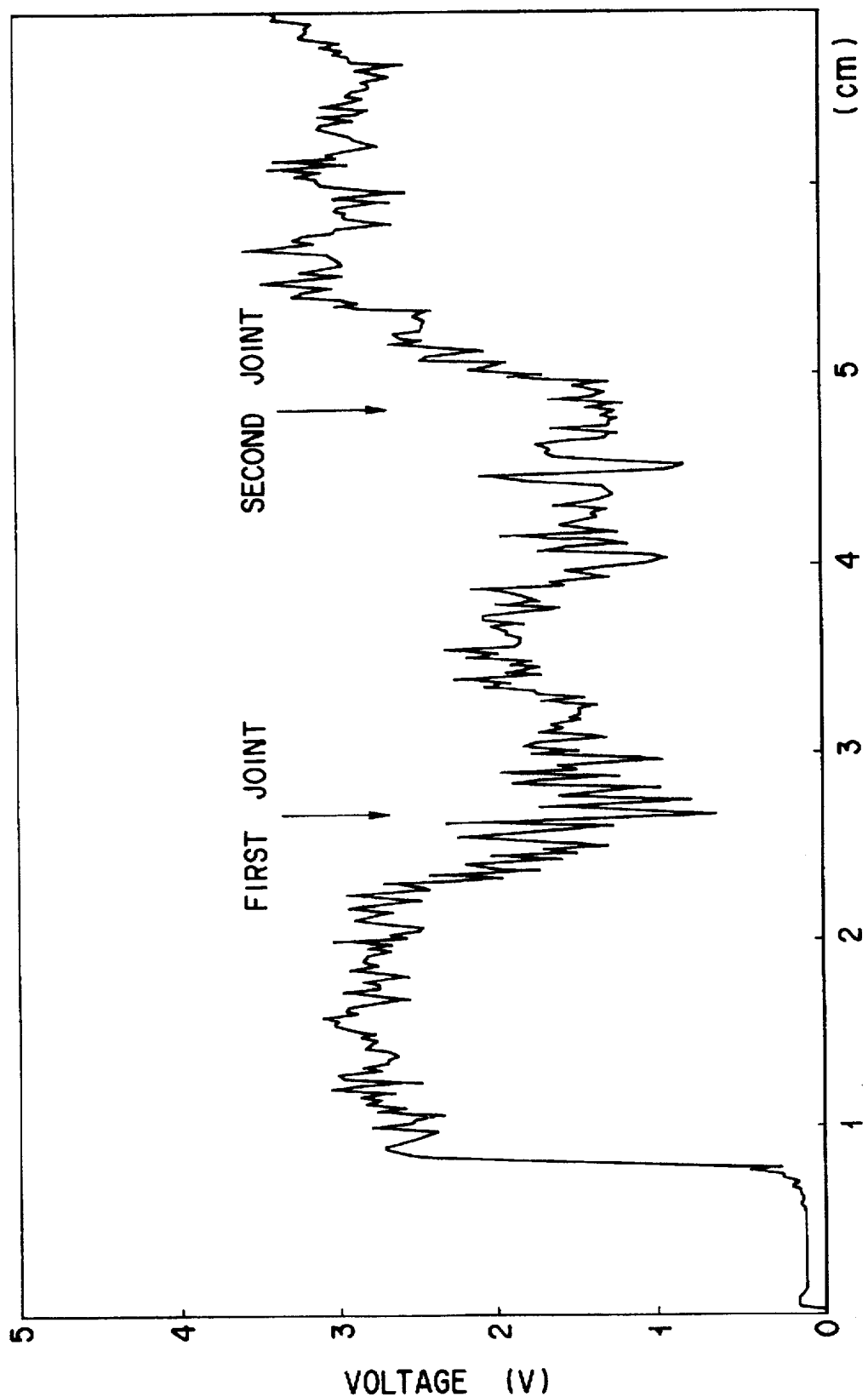

FIG. 7A shows an example of a detection signal (fingerprint information) obtained by using a finger according to the above embodiment of the present invention, while FIG. 7B shows an example of a detection signal obtained by using the same finger according to the conventional method in which the finger is brought into direct contact with electrodes (bare electrodes). The measurement is performed using a porous film of a thickness of 10 μm, formed of polycarbonate, having pores of an average diameter of 0.5 μm, with a pore density of $1 \times 10^6/cm^2$. It is clear, from both figures, that the detection signal obtained by the embodiment is substantially equivalent to that obtained by the conventional method. It is desirable that the pores formed in the porous film have a diameter smaller than the fingerprint pitch (about 0.5 mm), preferably, several tens μm, for example that is less than or equal to 1 mm. The pore density should preferably as high as possible, but the pore ratio (area) can be 5 to 50%, so far as the water-proof characteristic and strength of the film are maintained. The thickness of the film is preferably 100 μm or thinner, so far as the film may not be damaged or deformed by the pressure of a finger.

FIG. 8 shows a first modification of the input unit 101. The porous film 2 has a mark indicating the position on which a finger is to be placed. With this modification, the position of the electrode array, i.e., the sensing portion, is clearly indicated. In addition, the repeatability can be improved by limiting the position of the finger. The mark can be a simple arrow to indicate the direction of the finger.

FIG. 9 shows a second modification of the input unit 101. As shown in FIG. 9, most part of the linear electrodes is covered by the porous film 2, while the other parts thereof are covered by films 11 which do not transmit water vapor. The process of forming an electrode array with a simple pattern and covering the unnecessary portions with the films which do not transmit water vapor is more advantageous, in terms of cost and packaging into a system, as compared to the process of forming an electrode array only in the required portion, since the former process has a greater degree of freedom in design and production.

Moreover, in the personal verification system using the input unit 101 of the second modification, a resistance value of a portion between electrodes under the film 11 which does not transmit water vapor is used as a reference, as shown in FIG. 10. The reference resistance value is subtracted from a measurement signal, whereby the influence of noise or the like can be reduced. More specifically, assuming that the resistance between the electrodes under the film 11 is $R_{11}$ and the resistance of the conductive path formed by water vapor between the electrodes is $R_2$, a voltage of $V_2 = R_2 \cdot V_0 / (R_{ref} + R_2)$ is applied to a resistor R' connected to a (−) input terminal of a differential amplifier shown in FIG. 10, while a voltage of $V_{11} = R_{11} \cdot V_0 / (R_{ref} + R_{11})$ is applied to a resistor R' connected to a (+) input terminal thereof. The differential amplifier therefore outputs, through an output terminal, a value $V_{oup} = -R'' \cdot (V_2 - V_{11})/R'$ with reference to the resistance between the electrodes located under the film 11.

Although the differential amplifier is used as a circuit for obtaining a measurement signal in the above example, the present invention is not limited to this example. Any circuit can be used so long as it outputs a measurement signal obtained from electrodes under a porous film with reference to a signal obtained from electrodes under a film which does not transmit water vapor.

As has been described above, according to the present invention, there is provided a personal verification system, wherein a plurality of long linear electrodes, extending in a direction perpendicular to the longitudinal direction of a finger, are arranged alongside, and resistances across adjacent electrodes are serially read and synthesized as a signal, which is used instead of an image signal. Since the electrodes of the present invention are covered by a porous film, the drawbacks of the conventional system, for performing measurement using exposed electrodes, can be overcome: that is, even if waterdrop is adhered to the system or a finger is stained, finger information is not influenced by the change of the environment and satisfactory repeatability is maintained. Thus, the system of the present invention produces a stable signal and the reliability of the verification is improved. In addition, the system of the present invention has the advantage of the conventional system, that is, it can be mounted on a small device. The present invention is therefore applicable to an IC card.

Further, the wear of the porous film due to longtime use can be reduced by filling the pores in the film with a conductive material, such as metal, by means of deposition or the like. Al, Au, or Pt can be used as the filling metal.

Furthermore, antibacterial material may be mixed with the resin material of the porous film, in which case, it is possible to provide the users with a safer and more serviceable personal verification system. The antibacterial material to be mixed with the resin may be inorganic material, in which a carrier, such as zeolite, silica or alumina, carries Ag, Cu, or Zn, for example, antibacterial zeolite. Organic material can also be used as the antibacterial material, examples of which are TBZ:2-(4-thiazolyl)-benzimidazole, OBPA:10, 10'-oxybisphenoxaarsine, A3:N-(fluorodichloromethylthio) -phthalimide, M8:2-n-octyl-4-isothiazole-3-on, ZPT: bis(2-pyridylthio-1-oxide) zinc, S-100:2,3,5,6-tetrachloro-4-(methylsulfonyl)-pyridine.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A personal verification system comprising:

a plurality of linear electrodes arranged on a substrate;

a non-conductive porous film formed of a material which repels water and transmits water vapor arranged on the plurality of linear electrodes; and detector for detecting a change in resistance across the linear electrodes based on transmitted water vapor, when a finger is placed on the porous film in a direction substantially perpendicular to a longitudinal direction of the linear electrodes.

2. A personal verification system according to claim 1, wherein the detector serially detects values of resistance between two of the linear electrodes along a longitudinal direction of the finger.

3. A personal verification system according to claim 2, wherein the two of the linear electrodes are adjacent to each other.

4. A personal verification system according to claim 1, wherein the porous film has a mark on which the finger is to be placed.

5. A personal verification system according to claim 1, wherein the porous film is formed of an organic material selected from a group including of fluoroplastics, polycarbonate and cellulose acetate.

6. A personal verification system according to claim 1, wherein the porous film covers a predetermined portion of the linear electrodes, and has a portion which does not transmit water vapor except for the predetermined portion.

7. A personal verification system according to claim 6, wherein the detector detects the change in resistance across the linear electrodes with reference to resistance across linear electrodes covered by the portion which does not transmit water vapor.

8. A personal verification system according to claim 1, wherein the porous film is formed of antibacterial material.

9. A personal verification system according to claim 1, wherein the porous film includes pores which are formed between a surface of the porous film and at least one of the linear electrodes, and formed between adjacent two of the linear electrodes.

10. A personal verification system comprising:

a plurality of linear electrodes arranged on a substrate;

a non-conductive porous film formed of a material which repels water and transmits water vapor arranged on the plurality of linear electrodes; and detector for detecting a change in resistance across the linear electrodes based on transmitted water vapor, when a finger is placed on the porous film in a direction substantially perpendicular to a longitudinal direction of the linear electrodes;

wherein the porous film includes pores which have a diameter equal to or smaller than 1 mm, the pore ratio of the porous film is 5 to 50%, and a thickness of the porous film is equal to or less than 100 μm.

11. A personal verification system according to claim 10, wherein the detector serially detects values of resistance between two of the linear electrodes along a longitudinal direction of the finger.

12. A personal verification system according to claim 11, wherein the two of the linear electrodes are adjacent to each other.

13. A personal verification system according to claim 10, wherein the porous film has a mark on which the finger is to be placed.

14. A personal verification system according to claim 10, wherein the porous film is formed of an organic material selected from the group consisting of fluoroplastics, polycarbonates and cellulose acetates.

15. A personal verification system according to claim 10, wherein the porous film covers a predetermined portion of the linear electrodes, and has a portion which does not transmit water vapor except for the predetermined portion.

16. A personal verification system according to claim 15, wherein the detector detects the change in resistance across the linear electrodes with reference to resistance across linear electrodes covered by the portion which does not transmit water vapor.

17. A personal verification system according to claim 10, wherein the porous film is formed of antibacterial material.

18. A personal verification system according to claim 10, wherein the porous film includes pores which are formed between a surface of the porous film and at least one of the linear electrodes, and formed between adjacent two of the linear electrodes.

19. A personal verification system comprising:

a plurality of linear electrodes arranged on a substrate;

a non-conductive porous film formed of a material which repels water and transmits water vapor arranged on the plurality of linear electrodes and substantially in contact with all of the plurality of linear electrodes; and detector for detecting a change in resistance across the linear electrodes based on transmitted water vapor, when a finger is placed on the porous film in a direction substantially perpendicular to a longitudinal direction of the linear electrodes.

20. A personal verification system according to claim 19, wherein the detector serially detects values of resistance between two of the linear electrodes along a longitudinal direction of the finger.

21. A personal verification system according to claim 20, wherein the two of the linear electrodes are adjacent to each other.

22. A personal verification system according to claim 19, wherein the porous film has a mark on which the finger is to be placed.

23. A personal verification system according to claim 19, wherein the porous film is formed of an organic material selected from the group consisting of fluoroplastics, polycarbonates and cellulose acetates.

24. A personal verification system according to claim 19, wherein the porous film covers a predetermined portion of the linear electrodes, and has a portion which does not transmit water vapor except for the predetermined portion.

25. A personal verification system according to claim 24, wherein the detector detects the change in resistance across the linear electrodes with reference to resistance across linear electrodes covered by the portion which does not transmit water vapor.

26. A personal verification system according to claim 19, wherein the porous film is formed of antibacterial material.

27. A personal verification system according to claim 19, wherein the porous film includes pores which are formed between a surface of the porous film and at least one of the linear electrodes, and formed between adjacent two of the linear electrodes.

28. A personal verification system according to claim 19, wherein the porous film includes pores which have a diameter equal to or smaller than 1 mm, the pore ratio of the porous film 5 to 50%, and a thickness of the porous film is equal to or less than 100 μm.

* * * * *